United States Patent
Wang

(10) Patent No.: US 10,587,883 B2
(45) Date of Patent: Mar. 10, 2020

(54) REGION-WISE PACKING, CONTENT COVERAGE, AND SIGNALING FRAME PACKING FOR MEDIA CONTENT

(71) Applicant: QUALCOMM Incorporated, San Diego, CA (US)

(72) Inventor: Ye-Kui Wang, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/028,255

(22) Filed: Jul. 5, 2018

(65) Prior Publication Data

US 2019/0020880 A1   Jan. 17, 2019

Related U.S. Application Data

(60) Provisional application No. 62/532,862, filed on Jul. 14, 2017.

(51) Int. Cl.
*H04N 19/176* (2014.01)
*H04N 21/854* (2011.01)
(Continued)

(52) U.S. Cl.
CPC .......... *H04N 19/176* (2014.11); *G06F 3/011* (2013.01); *H04L 65/4084* (2013.01); *H04L 65/605* (2013.01); *H04L 65/607* (2013.01); *H04L 65/608* (2013.01); *H04N 19/167* (2014.11); *H04N 19/172* (2014.11); *H04N 19/188* (2014.11); *H04N 19/44* (2014.11); *H04N 19/583* (2014.11); *H04N 19/597* (2014.11); *H04N 19/70* (2014.11); *H04N 21/6332* (2013.01); *H04N 21/64322* (2013.01);
(Continued)

(58) Field of Classification Search
CPC .... H04N 19/119; H04N 19/189; H04N 19/46; H04N 19/85; H04N 19/98
USPC .......................... 375/240.24, 240.25, 240.29
See application file for complete search history.

(56) References Cited

U.S. PATENT DOCUMENTS

| 2011/0222597 A1* | 9/2011 | Xu | H04N 19/70 |
| | | | 375/240.01 |
| 2019/0228253 A1* | 7/2019 | Ramaswamy | G06K 9/3233 |

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
(Continued)

*Primary Examiner* — Dominic D Saltarelli
(74) *Attorney, Agent, or Firm* — Shumaker & Sieffert, P.A.

(57) ABSTRACT

In one example, a device for processing media content includes a memory configured to store media content; and one or more processors implemented in circuitry and configured to process a first packed region of the media content, wherein to process the first packed region, the one or more processors are configured to unpack the first packed region to produce a first unpacked region, and form a first projected region from the first unpacked region; and process a second packed region of the media content, the second packed region overlapping the first packed region at least in part, wherein to process the second packed region, the one or more processors are configured to unpack the second packed region to produce a second unpacked region, and form a second projected region from the second unpacked region.

39 Claims, 8 Drawing Sheets

(51) Int. Cl.
| | |
|---|---|
| H04L 29/06 | (2006.01) |
| H04N 19/167 | (2014.01) |
| H04N 19/169 | (2014.01) |
| H04N 19/583 | (2014.01) |
| H04N 19/70 | (2014.01) |
| G06F 3/01 | (2006.01) |
| H04N 19/172 | (2014.01) |
| H04N 21/6332 | (2011.01) |
| H04N 21/643 | (2011.01) |
| H04N 19/597 | (2014.01) |
| H04N 19/44 | (2014.01) |
| H04N 21/845 | (2011.01) |
| H04L 29/08 | (2006.01) |

(52) U.S. Cl.
CPC ... *H04N 21/8456* (2013.01); *H04N 21/85406* (2013.01); *H04L 67/02* (2013.01)

(56) References Cited

OTHER PUBLICATIONS

International Standard ISO/IEC 14496-12, Information Technology—Coding of audio-visual objects—Part 12: ISO base media file format, Third Edition, Oct. 15, 2008, 120 pp.
"Information technology—Coding of audio-visual objects—Part 15: Carriage of network abstraction layer (NAL) unit structured video in the ISO base media file format," International Standard Organization, ISO/IEC FDIS 14496-15-2014; Jan. 13, 2014, 179 pp.
ISO/IEC 23009-1: "Information technology—Dynamic adaptive streaming over HTTP (DASH)—Part 1: Media presentation description and segment formats," Technologies de l' information—Diffusion en flux adaptatif dynamique sur HTTP (DASH)—Part 1: Description of the presentation and delivery of media formats, ISO/IEC 23009-1 International Standard, First Edition, Apr. 1, 2012 (Apr. 1, 2012), pp. I-VI, 1-126, XP002712145, paragraph 4.7-A.9 paragraph [OA.4].
International Standard, "Information Technology—High Efficiency Coding and Media Delivery in Heterogeneous nvironments—Part 2: High efficiency video coding," ISO/IEC 23008-2, First edition, Dec. 1, 2013, 312 pp.
Fielding, "Hypertext Transfer Protocol—HTTP/1.1; rfc2616.Txt," Jun. 1, 1999, Jun. 1, 1999 (Jun. 1, 1999), XP015008399, pp. 1-177, ISSN: 0000-0003.
Paila T., et al., "Flute-File Delivery over Unidirectional Transport," Network Working Group, RFC 6726, Nov. 2012, Retrieved from http://tools.ietf.org/html/rfc6726, 46 Pages.
Wang Y.K., et al., "SEI messages on SEI Messages", 27th JCT-VC Meeting; Mar. 31, 2017-Jul. 4, 2017; Hobart; (Joint Collaborative Team on Video Coding of ISO/IEC JTC1/SC29/WG11 and ITU-T SG.16); URL: http://wftp3.itu.int/av-arch/jctvc-site/,,No. JCTVC-AA0026, Mar. 21, 2017, XP030118192, 5 pages.

Ye, et al., "Algorithm descriptions of projection format conversion and video quality metrics in 360Lib Version 5," 8th Meeting; Macao, CN, Oct. 18-24, 2017 (Joint Collaborative Team on Video Coding of ISO/IEC JTC1/SC29/WG11 and ITU-T SG.16); No. JVET-H1004, 43 pp.
Wang et al., "Omnidirectional media format SEI messages," 28th Meeting; Torino, IT, Jul. 15-21, 2017; (Joint Collaborative Team on Video Coding of ISO/IEC JTC1/SC29/WG11 and ITU-T SG.16); No. JVCTVC-AB0026v3, Jul. 9, 2017, 12 pp.
Boyce, et al., "HEVC Additional Supplemental Enhancement Information (Draft 4)," 29th Meeting; Macao, CN, Oct. 19-25, 2017; (Joint Collaborative Team on Video Coding of ISO/IEC JTC1/SC29/WG11 and ITU-T SG.16); Jan. 16, 2018, 51 pp.
Choi, et al., "WD on ISO/IEC 2300-20 Omnidirectional Media Application Format," Working Draft, ISO/IEC JTC1/ SC29/ WG11 N16189, Jun. 2016, 42 pp.
Sanchez, et al., "Profiles under Considerations for ISO/IEC 23000-20 Omnidirectional Media Format," ISO/IEC JTC1/SC29/WG 11 N16952, Jul. 2017 ,54 pp.
"Information technology—Coded representation of immersive media (MPEG-I)—Part 2: Omnidirectional media format," ISO/IEC JTC 1/SC29, ISO/IEC FDIS 23090-2, Apr. 26, 2018, 182 pp.
"Information Technology—MPEG Systems Technologies—Part 8: Coding—Independent Code Points", International Standard, ISO/IEC 23001-8:2016 (E), Second Edition May 1, 2016, 44 Pages.
Choi B., et al., "OMAF DIS Text with Updates Based on Berlin OMAF AHG Meeting Agreements,"119. MPEG Meeting; Jul. 17, 2017-Jul. 21, 2017; Torino; (Motion Picture Expert Group or ISO/IEC JTC1/SC29/WG11), No. m40849, Jun. 16, 2017, XP030069193, 70 pages.
Hannuksela M M., et al., "OMAF architecture", 116. MPEG Meeting; Oct. 17, 2016-Oct. 21, 2016; Chengdu; (Motion Picture Expert Group or ISO/IEC JTC1/SC29/WG11), No. m38943, Oct. 12, 2016 (Oct. 12, 2016), XP030067291, 6 pages.
International Search Report and Written Opinion—PCT/US2018/041109—ISA/EPO—dated Oct. 1, 2018—15 pp.
Lai P., "OMAF PACK-VE Report", 117. MPEG Meeting; Jan. 16, 2017-Jan. 20, 2017; Geneva; (Motion Picture Expert Group or ISO/IEC JTC1/SC29/WG11), No. m39862, Jan. 13, 2017 (Jan. 13, 2017), XP030068207, 48 pages.
Oh S., et al., "OMAF: Generalized Signaling of Region-wise Packing for Omnidirectional Video," 118. MPEG Meeting; Mar. 4, 2017-Jul. 4, 2017; Hobart; (Motion Picture Expert Group or ISO/IEC JTC1/SC29/WG11) No. m40423, Mar. 29, 2017, XP030068768, 4 pages.
Oh S., et al., "SEI Message for Signaling of 360-Degree Video Information", 26. JCT-VC Meeting; Jan. 12, 2017-Jan. 20, 2017; Geneva; (Joint Collaborative Team on Video Coding of ISO/IEC JTC1/SC29/WG11 and ITU-T SG.16); URL: http:/wftp3.itu.int/av-arch/jctvc-site/ , No. JCTVC-Z0026, Jan. 4, 2017 (Jan. 4, 2017), XP030118132, pp. 6.

* cited by examiner

REGION-WISE PACKING, CONTENT COVERAGE, AND SIGNALING FRAME PACKING FOR MEDIA CONTENT

This application claims the benefit of U.S. Provisional Application No. 62/532,862, filed Jul. 14, 2017, the entire content of which is hereby incorporated by reference.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to High Efficiency Video Coding (HEVC)), and extensions of such standards, to transmit and receive digital video information more efficiently.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques related to processing media data. In particular, the techniques include region-wise packing that enables prevention of sending of a picture area that is the same as another area, to save bits. The bits saving can be achieved both within a picture of monoscopic virtual reality (VR) video content, or within a view of stereoscopic VR video content. These techniques apply to signalling of region-wise packing in both container files and in video bitstreams. The techniques also include content coverage signaling that enables signalling of the entire content coverage in a Dynamic Adaptive Streaming over HTTP (DASH) Media Presentation Description (MPD) of a media presentation for which the video content is carried in multiple adaptation sets. The techniques also include signaling frame packing information in a DASH MPD that enables signalling of whether each color component plane of each constituent frame is quincunx (checkerboard) sampled for frame packed video content. This information may be used to determine whether a receiver has the capability to properly de-frame-pack and render the video content, in addition to the frame packing type.

In one example, a method of processing media content includes processing a first packed region of media content, wherein processing the first packed region comprises: unpacking the first packed region to produce a first unpacked region, and forming a first projected region from the first unpacked region; and processing a second packed region of the media content, the second packed region overlapping the first packed region at least in part, wherein processing the second packed region comprises: unpacking the second packed region to produce a second unpacked region, and forming a second projected region from the second unpacked region, the second projected region being different than the first projected region.

In another example, a device for processing media content includes a memory configured to store media content; and one or more processors implemented in circuitry and configured to process a first packed region of the media content, wherein to process the first packed region, the one or more processors are configured to unpack the first packed region to produce a first unpacked region, and form a first projected region from the first unpacked region; and process a second packed region of the media content, the second packed region overlapping the first packed region at least in part, wherein to process the second packed region, the one or more processors are configured to unpack the second packed region to produce a second unpacked region, and form a second projected region from the second unpacked region.

In another example, a device for processing media content includes means for processing a first packed region of media content, wherein the means for processing the first packed region comprises: means for unpacking the first packed region to produce a first unpacked region, and means for forming a first projected region from the first unpacked region; and means for processing a second packed region of the media content, the second packed region overlapping the first packed region at least in part, wherein the means for processing the second packed region comprises: means for unpacking the second packed region to produce a second unpacked region, and means for forming a second projected region from the second unpacked region, the second projected region being different than the first projected region.

In another example, a computer-readable storage medium has stored thereon instructions that cause a processor to process a first packed region of media content, wherein the instructions that cause the processor to process the first packed region comprise instructions that cause the processor to: unpack the first packed region to produce a first unpacked region, and form a first projected region from the first unpacked region; and process a second packed region of the media content, the second packed region overlapping the first packed region at least in part, wherein the instructions that cause the processor to process the second packed region comprise instructions that cause the processor to: unpack the second packed region to produce a second unpacked region, and form a second projected region from the second unpacked region, the second projected region being different than the first projected region.

The details of one or more examples are set forth in the accompanying drawings and the description below. Other features, objects, and advantages will be apparent from the description and drawings, and from the claims.

DETAILED DESCRIPTION

Figure 1:
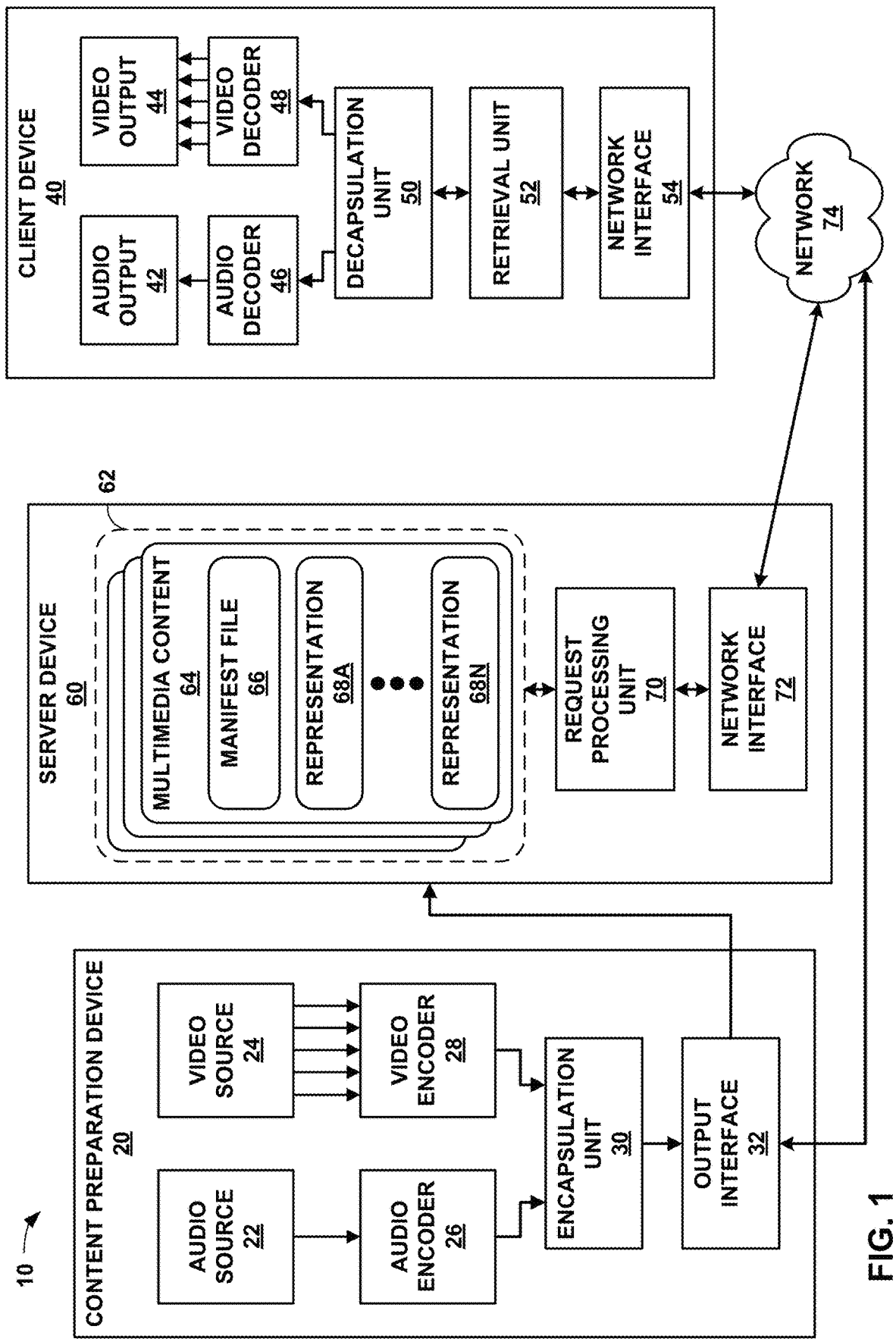
FIG. 1 is a block diagram illustrating an example system that implements techniques for streaming media data over a network.

The techniques of this disclosure may be applied to video files conforming to video data encapsulated according to any of ISO base media file format (ISOBMFF), extensions to ISOBMFF, Scalable Video Coding (SVC) file format, Advanced Video Coding (AVC) file format, High Efficiency Video Coding (HEVC) file format, Third Generation Partnership Project (3GPP) file format, and/or Multiview Video Coding (MVC) file format, or other video file formats. A draft of ISO BMFF is specified in ISO/IEC 14496-12, available from phenix.int-evry.fr/mpeg/doc_end_user/documents/111_Geneva/wg11/w15177-v6-w15177.zip. A draft of another example file format, MPEG-4 file format, is specified in ISO/IEC 14496-15, available from wg11.sc29.org/doc_end_user/documents/115_Geneva/wg11/w16169-v2-w16169.zip.

ISOBMFF is used as the basis for many codec encapsulation formats, such as the AVC file format, as well as for many multimedia container formats, such as the MPEG-4 file format, the 3GPP file format (3GP), and the digital video broadcasting (DVB) file format.

In addition to continuous media, such as audio and video, static media, such as images, as well as metadata can be stored in a file conforming to ISOBMFF. Files structured according to the ISOBMFF may be used for many purposes, including local media file playback, progressive downloading of a remote file, segments for Dynamic Adaptive Streaming over HTTP (DASH), containers for content to be streamed and its packetization instructions, and recording of received real-time media streams.

A box is an elementary syntax structure in ISOBMFF, including a four-character coded box type, the byte count of the box, and the payload. An ISOBMFF file includes a sequence of boxes, and boxes may contain other boxes. According to ISOBMFF, a Movie box ("moov") contains the metadata for the continuous media streams present in the file, each one represented in the file as a track. Per ISOBMFF, metadata for a track is enclosed in a Track box ("trak"), while the media content of a track is either enclosed in a Media Data box ("mdat") or provided directly in a separate file. The media content for tracks includes a sequence of samples, such as audio or video access units.

ISOBMFF specifies the following types of tracks: a media track, which contains an elementary media stream, a hint track, which either includes media transmission instructions or represents a received packet stream, and a timed metadata track, which comprises time-synchronized metadata.

Although originally designed for storage, the ISOBMFF has proven to be very valuable for streaming, e.g., for progressive download or DASH. For streaming purposes, movie fragments defined in ISOBMFF can be used.

The metadata for each track includes a list of sample description entries, each providing the coding or encapsulation format used in the track and the initialization data needed for processing that format. Each sample is associated with one of the sample description entries of the track.

The ISOBMFF enables specifying sample-specific metadata with various mechanisms. Specific boxes within the Sample Table box ("stbl") have been standardized to respond to common needs. For example, a Sync Sample box ("stss") is used to list the random access samples of the track. The sample grouping mechanism enables mapping of samples according to a four-character grouping type into groups of samples sharing the same property specified as a sample group description entry in the file. Several grouping types have been specified in the ISOBMFF.

Virtual reality (VR) is the ability to be virtually present in a virtual, non-physical world created by the rendering of natural and/or synthetic images and sounds correlated by movements of an immersed user, allowing interaction with that virtual world. With recent progress made in rendering devices, such as head mounted displays (HMD) and VR video (often also referred to as 360-degree video) creation, a significant quality of experience can be offered. VR applications include gaming, training, education, sports video, online shopping, entrainment, and so on.

A typical VR system includes the following components and steps:

1) A camera set, which typically includes multiple individual cameras pointing in different directions, ideally collectively covering all viewpoints around the camera set.
2) Image stitching, where video pictures taken by the multiple individual cameras are synchronized in the time domain and stitched in the space domain, to be a spherical video, but mapped to a rectangular format, such as equi-rectangular (like a world map) or cube map.
3) The video in the mapped rectangular format is encoded/compressed using a video codec, e.g., H.265/HEVC or H.264/AVC.
4) The compressed video bitstream(s) may be stored and/or encapsulated in a media format and transmitted (possibly only the subset covering the area being seen by a user, sometimes referred to as the viewport) through a network to a receiving device (e.g., a client device).
5) The receiving device receives the video bitstream(s) or part thereof, possibly encapsulated in a file format, and sends the decoded video signal or part thereof to a rendering device (which may be included in the same client device as the receiving device).
6) The rendering device can be, e.g., a head mounted display (HMD), which can track head movement and even eye movement, and may render the corresponding part of the video such that an immersive experience is delivered to the user.

Omnidirectional MediA Format (OMAF) is being developed by the Moving Pictures Experts Group (MPEG) to define a media format that enables omnidirectional media applications, focusing on VR applications with 360-degree video and associated audio. OMAF specifies a list of projection methods that can be used for conversion of a spherical or 360-degree video into a two-dimensional rectangular video, followed by how to store omnidirectional media and the associated metadata using the ISO base media file format (ISOBMFF) and how to encapsulate, signal, and stream omnidirectional media using dynamic adaptive streaming over HTTP (DASH), and finally, which video and audio codecs, as well as media coding configurations, can be used for compression and playback of the omnidirectional media signal. OMAF is to become ISO/IEC 23090-2, and a draft specification is available from wg11.sc29.org/doc_en-d_user/documents/119_Torino/wg11/m40849-v1-m40849_OMAF_text_Berlin_output.zip.

In HTTP streaming protocols, such as DASH, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming, because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

DASH is specified in ISO/IEC 23009-1, and is a standard for HTTP (adaptive) streaming applications. ISO/IEC 23009-1 mainly specifies the format of the media presentation description (MPD), also known as a manifest or manifest file, and media segment formats. The MPD describes the media available on a server and allows a DASH client to autonomously download an appropriate media version at an appropriate media time.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

A typical procedure for DASH based HTTP streaming includes the following steps:

1) A DASH client obtains the MPD of a streaming content, e.g., a movie. The MPD includes information on different alternative representations, e.g., bit rate, video resolution, frame rate, audio language, of the streaming content, as well as URLs of the HTTP resources (the initialization segment and the media segments).

2) Based on information in the MPD and local information available to the DASH client, e.g., network bandwidth, decoding/display capabilities, and user preferences, the DASH client requests the desired representation(s), one segment (or a part thereof) at a time.

3) When the DASH client detects a network bandwidth change, it requests segments of a different representation with a better-matching bitrate, ideally starting from a segment that starts with a random access point.

During an HTTP streaming "session," to respond to a user request to seek backward to a past position or forward to a future position, the DASH client requests past or future segments starting from a segment that is close to the desired position and that ideally starts with a random access point. The user may also request to fast-forward the content, which may be realized by requesting data sufficient for decoding only intra-coded video pictures or only a temporal subset of the video stream.

Section 5.3.3.1 of the DASH specification describes Preselection as follows:

The concept of Preselection is primarily motivated for the purpose of Next Generation Audio (NGA) codecs in order to signal suitable combinations of audio elements that are offered in different Adaptation Sets. However, the Preselection concept is introduced in a generic manner such that it can be extended and be used also for other media types and codecs.

Each Preselection is associated to a bundle. A bundle is a set of elements which may be consumed jointly by a single decoder instance. Elements are addressable and separable components of a bundle and may be selected or deselected dynamically by the application, either directly or indirectly by the use of Preselections. Elements are mapped to Adaptation Sets by either a one-to-one mapping or by the inclusion of multiple elements in a single Adaptation Sets. Furthermore, Representations in one Adaptation Set may contain multiple elements that are multiplexed on elementary stream level or on file container level. In the multiplexing case each element is mapped to a Media Content component as defined in DASH Section 5.3.4. Each element in the bundle is therefore identified and referenced by the @id of a Media Content component, or, if only a single element is contained in the Adaptation Set, by the @id of an Adaptation Set.

Each bundle includes a main element that contains the decoder specific information and bootstraps the decoder. The Adaptation Set that contains the main element is referred to as main Adaptation Set. The main element shall always be included in any Preselection that is associated to a bundle. In addition, each bundle may include one or multiple partial Adaptation Sets. Partial Adaptation Sets may only be processed in combination with the main Adaptation Set.

A Preselection defines a subset of elements in a bundle that are expected to be consumed jointly. A Preselection is identified by a unique tag towards the decoder. Multiple Preselection instances can refer to the same set of streams in a bundle. Only elements of the same bundle can contribute to the decoding and rendering of a Preselection.

In the case of next generation audio, a Preselection is a personalization option that is associated with one or more audio elements from one plus additional parameters like gain, spatial location to produce a complete audio experience. A Preselection can be considered the NGA-equivalent of alternative audio tracks containing complete mixes using traditional audio codecs.

A bundle, Preselection, main element, main Adaptation Set and partial Adaptation Sets may be defined by one of the two means:

A preselection descriptor is defined in DASH Section 5.3.11.2. Such a descriptor enables simple setups and backward compatibility, but may not be suitable for advanced use cases.

A preselection element as defined in DASH Sections 5.3.11.3 and 5.3.11.4. The semantics of the Preselection element is provided in Table 17c in DASH Section 5.3.11.3, the XML syntax is provided in DASH Section 5.3.11.4.

The instantiation of the introduced concepts using both methods is provided in the following.

In both cases, if the Adaptation Set is not including the main Adaptation Set, then the Essential descriptor shall be used together with the @schemeIdURI as defined in DASH Section 5.3.11.2.

The DASH specification also describes a preselection descriptor, as follows:

A scheme is defined to be used with an Essential Descriptor as "urn:mpeg:dash:preselection:2016". The value of the Descriptor provides two fields, separated by a comma:

the tag of the Preselection the id of the contained elements/content components of this Preselection list as white space separated list in processing order. The first id defines the main element.

If the Adaptation Set includes the main element, then the Supplemental descriptor may be used to describe contained Preselections in the Adaptation Set.

If the Adaptation Set does not contain the main element then the Essential Descriptor shall be used.

The bundle is inherently defined by all elements that are included in all Preselections that include the same main element. Preselections are defined by the metadata that is assigned to each of the elements that are included in the Preselection. Note that this signalling may be simple for basic use cases, but is expected to not provide a full coverage for all use cases. Therefore the Preselection element is introduced in DASH Section 5.3.11.3 to cover more advanced use cases.

The DASH specification also describes semantics of a preselection element, as follows:

As an extension to the Preselection descriptor, Preselections may also be defined through the Preselection element as provided in Table 17d. The selection of Preselections is based on the contained attributes and elements in the Preselection element.

| Table 17d of DASH - Semantics of PreSelection element | | |
|---|---|---|
| Element or Attribute Name | Use | Description |
| Preselection | | |
| @id | OD default = 1 | specifies the id of the Preselection. This shall be unique within one Period. |
| @preselectionComponents | 1 | specifies the ids of the contained elements/content components of this Preselection list as white space separated list in processing order. The first id defines the main element. |

Table 17d of DASH - Semantics of PreSelection element

| Element or Attribute Name | Use | Description |
| --- | --- | --- |
| Language | 0 ... N | declares a language code for this Preselection. The syntax and semantics according to IETF RFC 5646 shall be used. If not present, the language code may be defined for each media component or it may be unknown. |
| Role | 0 ... N | describes the Role of the Preselection. For more details refer to 5.8.4.2. |
| Accessibility | 0 ... N | Describes the accessibility features of the Preselection. For more details refer to 5.8.4.3. |
| Accessibility | 0 ... N | specifies information about accessibility scheme For more details refer to 5.8.1 and 5.8.4.3. |
| Role | 0 ... N | specifies information on role annotation scheme For more details refer to 5.8.1 and 5.8.4.2. |
| Rating | 0 ... N | specifies information on rating scheme. For more details refer to 5.8.1 and 5.8.4.4. |
| Viewpoint | 0 ... N | specifies information on viewpoint annotation scheme. For more details refer to 5.8.1 and 5.8.4.5. |
| *CommonAttributes Elements* | — | specifies the common attributes and elements (attributes and elements from base type *RepresentationBaseType*. For details see 5.3.7. |

Legend:
For attributes: M = Mandatory, O = Optional, OD = Optional with Default Value, CM = Conditionally Mandatory.
For elements: <minOccurs>. . . <maxOccurs> (N = unbounded)
Elements are bold; attributes are non-bold and preceded with an @.

With respect to Frame Packing, Section 5.8.4.6 of DASH specifies Preselection as follows:
  For the element FramePacking the @schemeIdUri attribute is used to identify the frame-packing configuration scheme employed.
  Multiple FramePacking elements may be present. If so, each element shall contain sufficient information to select or reject the described Representations.
  NOTE if the scheme or the value for all FramePacking elements are not recognized the DASH client is expected to ignore the described Representations. A client may reject the Adaptation Set on the basis of observing a FramePacking element.
  The descriptor may carry frame-packing schemes using the URN label and values defined for VideoFramePackingType in ISO/IEC 23001-8.
  NOTE: This part of ISO/IEC 23009 also defines frame-packing schemes in DASH Section 5.8.5.6. These schemes are maintained for backward-compatibility, but it recommended to use the signalling as defined in ISO/IEC 23001-8.

Video data may be encoded according to a variety of video coding standards. Such video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 or ISO/IEC MPEG-4 AVC, including its Scalable Video Coding (SVC) and Multiview Video Coding (MVC) extensions, and High-Efficiency Video Coding (HEVC), also known as ITU-T H.265 and ISO/IEC 23008-2, including its scalable coding extension (i.e., scalable high-efficiency video coding, SHVC) and multiview extension (i.e., multiview high efficiency video coding, MV-HEVC).

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant.

In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Figure 3:
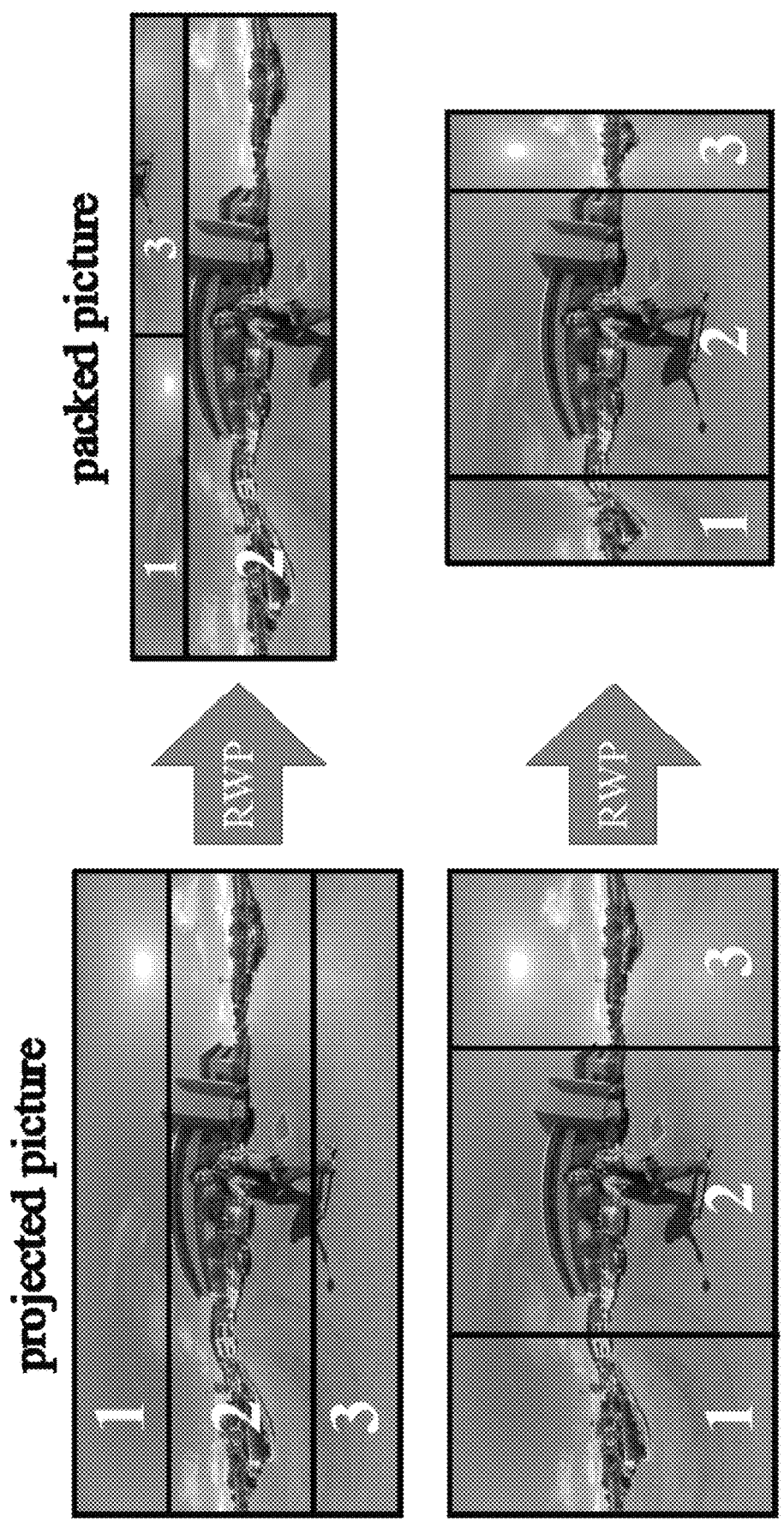
FIG. 3 is a conceptual diagram illustrating two examples of region-wise packing (RWP) for Omnidirectional MediA Format (OMAF).

Content preparation device 20 may obtain spherical video data using video source 24, e.g., by capturing and/or generating (e.g., rendering) the spherical video data. The spherical video data may also be referred to as projected video data. Content preparation device 20 may form packed video data from the projected video data (or spherical video data) for ease of encoding, processing, and transport. An example is shown in FIG. 3 below. In accordance with the techniques of this disclosure, two or more packed regions of video data may overlap, as indicated by region-wise packing information. Content preparation device 20 may generate a region-wise packing box (RWPB) that defines positions and sizes of the various packed regions, which may thus indicate an overlap between two or more packed regions. When one packed region overlaps another, content preparation device 20 may avoid encoding and storing/transporting data for the overlapped region more than once, to reduce bandwidth consumption, processing cycles, memory consumption, and the like. Client device 40 may retrieve data for an overlapped portion of one packed region from another packed region for which the overlapped portion was provided and coded.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate a elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

In the OMAF draft text, overlapping packed regions are disallowed. This disallows mapping of one packed region to multiple projected regions. MPEG input document m41558 proposes to allow overlapping packed regions as long as they map to different constituent pictures (i.e., different views) of a stereoscopic video content, such that it is possible to avoid sending of some regions of one view when they can be copied from the other view. However, this disallows both avoiding sending of some regions within one view of a picture of a stereoscopic video content and avoiding sending of some regions within one a picture of a monoscopic content.

According to the techniques of this disclosure, content preparation device 20, server device 60, and client device 40 may be configured such that overlapping packed regions are allowed regardless of whether the content is stereoscopic or monoscopic. When the content is stereoscopic, content preparation device 20, server device 60, and client device 40 may be configured such that overlapping packed regions are allowed regardless of whether the overlapping regions map to different constituent pictures.

For both the container file format and the video bitstreams, this is achieved by removing the following constraint from the semantics of the region-wise packing (RWP) box in the OMAF draft text and from the semantics of the omnidirectional region-wise packing SEI message in JCT-VC document JCTVC-AA0026:

The rectangle specified by packed_reg_width[i], packed_reg_height[i], packed_reg_top[i], and packed_reg_left[i] shall be non-overlapping with the rectangle specified by packed_reg_width[j], packed_reg_height[j], packed_reg_top[j], and packed_reg_left[j] for any value of j in the range of 0 to i−1, inclusive.

Thus, content preparation device 20, server device 60, and client device 40 may be configured to use RWP boxes that are not constrained as indicated above. Instead, content preparation device 20, server device 60, and client device 40 may be configured such that overlapping packed regions are allowed in these circumstances. Thus, content preparation device 20, server device 60, and client device 40 may be configured to process data in overlapping packed regions in these circumstances.

Furthermore, content preparation device 20 and/or server device 60 may be configured to determine boundaries of packed regions, and set values for packed_reg_width[i], packed_reg_height[i], packed_reg_top[i], and packed_reg_left[i] accordingly. Likewise, client device 40 may determine the boundaries (and therefore, sizes and positions) of packed regions from the values of packed_reg_width[i], packed_reg_height[i], packed_reg_top[i], and packed_reg_left[i]. By determining the boundaries and positions of packed regions using these values, client device 40 may determine that two or more packed regions overlap at least in part, and further, determine the position of the overlapped portion between two or more packed regions. Furthermore, client device 40 may determine a packed region from which to retrieve video data for filling an overlapped portion of another packed region using the values of packed_reg_width[i], packed_reg_height[i], packed_reg_top[i], and packed_reg_left[i] for the two packed regions.

This disclosure also recognizes that when entire media content is carried in multiple adaptation sets, a mechanism for signalling the content coverage for the entire content in the MPD is missing. Thus, according to the techniques of this disclosure, content preparation device 20, server device 60, and client device 40 may be configured such that a content coverage (CC) descriptor in OMAF may be present at the Adaptation Set level and at the Preselection level. That is, content preparation device 20, server device 60, and client device 40 may be configured to process the CC descriptor of OMAF at either or both of the Adaptation Set level and/or the Preselection level. The location of the CC descriptor may determine whether the coverage is local (when in an Adaptation Set) or global (when in a Preselection).

The DASH FramePacking element does not carry a QuincunxSamplingFlag of ISO/IEC 23001-8. However, this disclosure recognizes that this flag is needed, as it signals whether each colour component plane of each constituent frame is quincunx sampled. This information may be needed for determination of whether a receiver has the capability to properly de-frame-pack and render the video content, in addition to the frame packing type. Quincunx sampling may generally be considered "checkerboard" sampling, in which every other sample of a row and every other sample of a column belong to different pictures. Thus, for a sample at position (x, y) of a frame belonging to a left-eye picture, samples at positions (x−1, y), (x+1, y), (x, y+1), and (x, y−1) belong to a right-eye picture (assuming such samples are within the bounds of the frame).

A client device, such as client device 40, may use the quincunx sampling flag to determine whether client device 40 is capable of rendering the corresponding media content. For example, if video output 44 is able to render quincunx packed frames, retrieval unit 52 may determine that client device 40 is able to render frames of media data that the quincunx sampling flag indicates are quincunx packed. On the other hand, if video output 44 is not able to render quincunx packed frames, retrieval unit 52 may determine that client device 40 is not able to render frames of media data that the quincunx sampling flag indicates are quincunx packed, and thus, select alternative media data (e.g., a different one of representations 68) that a quincunx sampling flag indicates is not quincunx packed.

Accordingly, preparation device 20, server device 60, and client device 40 may be configured such that the @value of the FramePacking element may carry both VideoFramePackingType and QuincunxSamplingFlag values, in a comma separated format. That is, preparation device 20, server device 60, and client device 40 may process the @value of the FramePacking element, which may include processing both a VideoFramePackingType value and a QuincunxSamplingFlag value, the values separated by a comma. A proposed change to the DASH standard is as follows (the italicized text represents additions relative to the current version of DASH):

For the element FramePacking the @schemeIdUri attribute is used to identify the frame-packing configuration scheme employed.

Multiple FramePacking elements may be present. If so, each element shall contain sufficient information to select or reject the described Representations.

NOTE if the scheme or the value for all FramePacking elements are not recognized the DASH client is expected to ignore the described Representations. A client may reject the Adaptation Set on the basis of observing a FramePacking element.

The descriptor may carry frame-packing schemes using the URN label and values defined for comma separated VideoFramePackingType and QuincunxSamplingFlag in ISO/IEC 23001-8.

NOTE: This part of ISO/IEC 23009 also defines frame-packing schemes in 5.8.5.6. These schemes are maintained for backward-compatibility, but it recommended to use the signalling as defined in ISO/IEC 23001-8.

In accordance with the techniques of this disclosure, manifest file 66 may include data signaling a content coverage descriptor at an Adaptation Set level or at a Preselection level. Manifest file 66 may additionally or alternatively include region-wise packing boxes defining overlapping regions per the techniques of this disclosure. Manifest file 66 may additionally or alternatively include a FramePacking element having both a video frame packing type (VideoFramePackingType) value and a quincunx sampling value (QuincunxSamplingFlag), separated by commas, where the quincunx sampling value may indicate whether one or more corresponding frames are quincunx (checkerboard) packed.

Figure 2:
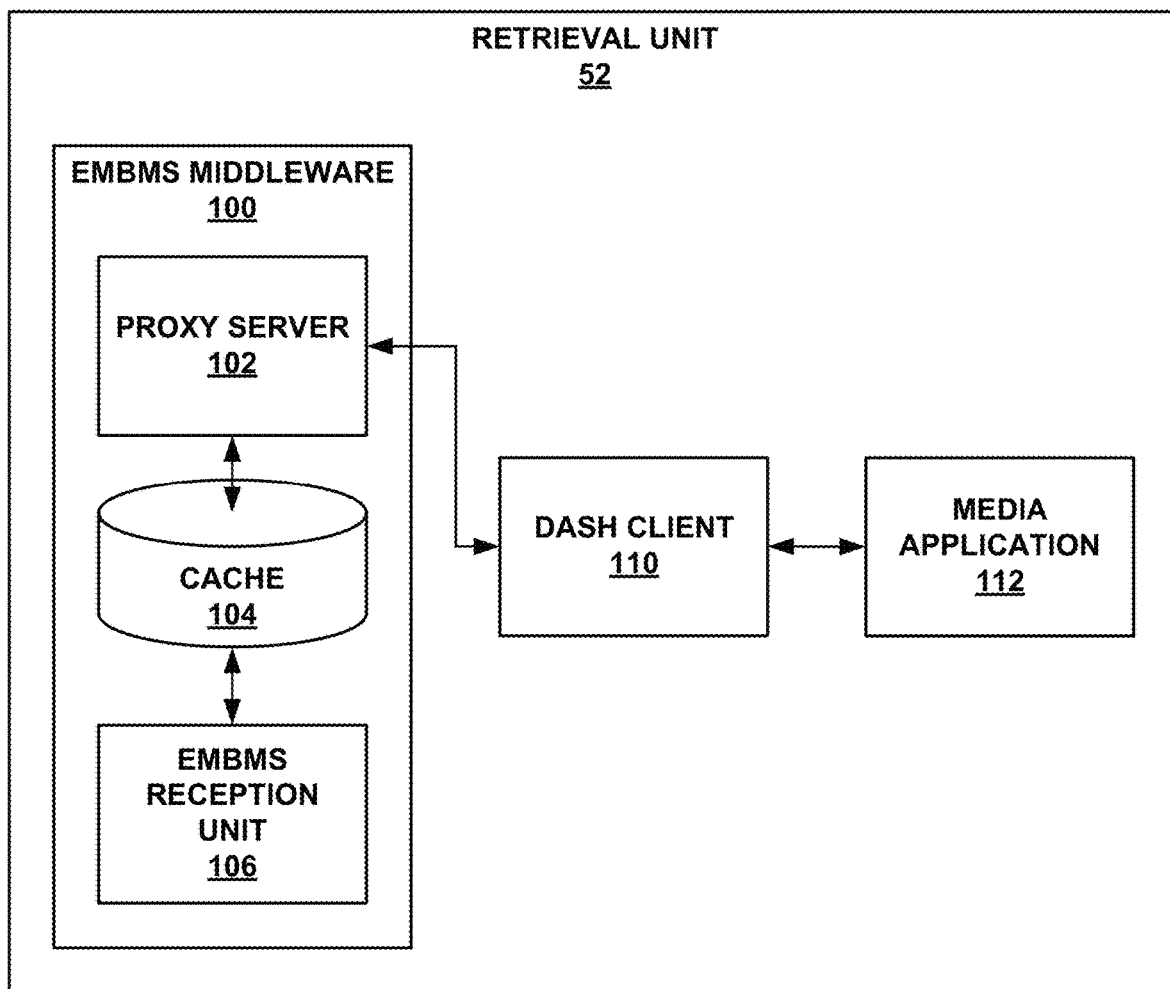
FIG. 2 is a block diagram illustrating an example set of components of a retrieval unit.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, and proxy server unit 102. In this example, eMBMS reception unit 106 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at tools.ietf.org/html/ rfc6726. That is, eMBMS reception unit 106 may receive files via broadcast from, e.g., server device 60, which may act as a BM-SC.

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Proxy server unit 102 may act as a server for DASH client 110. For example, proxy server unit 102 may provide a MPD file or other manifest file to DASH client 110. Proxy server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from proxy server unit 102 using HTTP GET or partial GET requests. For example, for a segment available from link 127.0.0.1/rep1/seg3, DASH client 110 may construct an HTTP GET request that includes a request for 127.0.0.1/rep1/seg3, and submit the request to proxy server unit 102. Proxy server unit 102 may retrieve requested data from cache 104 and provide the data to DASH client 110 in response to such requests.

FIG. 3 is a conceptual diagram illustrating two examples of region-wise packing (RWP) for OMAF. OMAF specifies a mechanism called region-wise packing (RWP). RWP enables manipulations (resize, reposition, rotation, and mirroring) of any rectangular region of a projected picture. RWP can be used to generate an emphasis on a specific viewport orientation or circumvent weaknesses of projections, such as oversampling towards the poles in ERP. The latter is depicted in the example at the top of FIG. 3 where the areas near the poles of the sphere video are reduced in resolution. The example at the bottom of FIG. 3 depicts an emphasized viewport orientation. Information on RWP is signalled in the RWP box, which is specified in clause 7.2.5 of the OMAF draft text, as follows:

2.5.1 Region-wise packing box 2.5.1.1 Definition

Box Type: 'rwpk'

Container: Scheme Information box ('schi')

Mandatory: No

Quantity: Zero or one

RegionWisePackingBox indicates that projected pictures are packed region-wise and require unpacking prior to rendering. The size of the projected picture is explicitly signalled in this box. The size of the packed picture is indicated by the width and height syntax elements of VisualSampleEntry, denoted as PackedPicWidth and PackedPicHeight, respectively.

NOTE 1: When the pictures are field pictures instead of frame pictures, the actual height of the packed pictures would be only half of PackedPicHeight.

2.5.1.2 Syntax

```
aligned(8) class RegionWisePackingBox extends FullBox('rwpk', 0, 0) {
    RegionWisePackingStruct( );
}
aligned(8) class RegionWisePackingStruct {
    unsigned int(8) num_regions;
    unsigned int(16) proj_picture_width;
    unsigned int(16) proj_picture_height;
    for (i = 0; i < num_regions; i++) {
        bit(3) reserved = 0;
        unsigned int(1) guard_band_flag[i];
        unsigned int(4) packing_type[i];
```

```
        if (packing_type[i] == 0) {
            RectRegionPacking(i);
            if (guard_band_flag[i]) {
                unsigned int(8) left_gb_width[i];
                unsigned int(8) right_gb_width[i];
                unsigned int(8) top_gb_height[i];
                unsigned int(8) bottom_gb_height[i];
                unsigned  int(1)
                gb_not_used_for_pred_flag[i];
                unsigned int(3) gb_type[i];
                bit(4) reserved = 0;
            }
        }
    }
}
aligned(8) class RectRegionPacking(i) {
    unsigned int(16) proj_reg_width[i];
    unsigned int(16) proj_reg_height[i];
    unsigned int(16) proj_reg_top[i];
    unsigned int(16) proj_reg_left[i];
    unsigned int(3) transform_type[i];
    bit(5) reserved = 0;
    unsigned int(16) packed_reg_width[i];
    unsigned int(16) packed_reg_height[i];
    unsigned int(16) packed_reg_top[i];
    unsigned int(16) packed_reg_left[i];
}
```

2.5.1.3 Semantics num_regions specifies the number of packed regions. Value 0 is reserved.

proj_picture_width and proj_picture_height specify the width and height, respectively, of the projected picture, in units of luma samples. proj_picture_width and proj_picture_height shall both be greater than 0.

guard_band_flag[i] equal to 0 specifies that the i-th packed region does not have a guard band. guard_band_flag[i] equal to 1 specifies that the i-th packed region has a guard band.

packing_type[i] specifies the type of region-wise packing. packing_type[i] equal to 0 indicates rectangular region-wise packing. Other values are reserved.

left_gb_width[i] specifies the width of the guard band on the left side of the i-th packed region in units of two luma samples.

right_gb_width[i] specifies the width of the guard band on the right side of the i-th packed region in units of two luma samples.

top_gb_height[i] specifies the height of the guard band above the i-th packed region in units of two luma samples.

bottom_gb_height[i] specifies the height of the guard band below the i-th packed region in units of two luma samples.

When guard_band_flag[i] is equal to 1, left_gb_width[i], right_gb_width[i], top_gb_height[i], or bottom_gb_height[i] shall be greater than 0.

The i-th packed region as specified by this RegionWisePackingStruct shall not overlap with any other packed region specified by the same RegionWisePackingStruct or any guard band specified by the same RegionWisePackingStruct.

The guard bands associated with the i-th packed region, if any, as specified by this RegionWisePackingStruct shall not overlap with any packed region specified by the same RegionWisePackingStruct or any other guard bands specified by the same RegionWisePackingStruct.

gb_not_used_for_pred_flag[i] equal to 0 specifies that the guard bands may or may not be used in the inter prediction process. gb_not_used_for_pred_flag[i] equal to 1 specifies that the sample values of the guard bands are not in the inter prediction process.

NOTE 1: When gb_not_used_for_pred_flag[i] is equal to 1, the sample values within guard bands in decoded pictures can be rewritten even if the decoded pictures were used as references for inter prediction of subsequent pictures to be decoded. For example, the content of a packed region can be seamlessly expanded to its guard band with decoded and re-projected samples of another packed region.

gb_type[i] specifies the type of the guard bands for the i-th packed region as follows:

gb_type[i] equal to 0 specifies that the content of the guard bands in relation to the content of the packed regions is unspecified. gb_type shall not be equal to 0, when gb_not_used_for_pred_flag is equal to 0.

gb_type[i] equal to 1 specifies that the content of the guard bands suffices for interpolation of sub-pixel values within the packed region and less than one pixel outside of the boundary of the packed region.

NOTE 2: gb_type equal to 1 can be used when the boundary samples of a packed region have been copied horizontally or vertically to the guard band.

gb_type[i] equal to 2 specifies that the content of the guard bands represents actual image content at quality that gradually changes from the picture quality of the packed region to that of the spherically adjacent packed region.

gb_type[i] equal to 3 specifies that the content of the guard bands represents actual image content at the picture quality of the packed region.

gb_type[i] values greater than 3 are reserved.

proj_reg_width[i], proj_reg_height[i], proj_reg_top[i] and proj_reg_left[i] are indicated in units of luma samples in a projected picture with width and height equal to proj_picture_width and proj_picture_height, respectively.

proj_reg_width[i] specifies the width of the i-th projected region. proj_reg_width[i] shall be greater than 0.

proj_reg_height[i] specifies the height of the i-th projected region. proj_reg_height[i] shall be greater than 0.

proj_reg_top[i] and proj_reg_left[i] specify the top luma sample row and the left-most luma sample column, respectively, of the i-th projected region in the projected picture. The values shall be in the range from 0, inclusive, indicating the top-left corner of the projected picture, to proj_picture_height−1, inclusive, and proj_picture_width−1, inclusive, respectively.

The sum of proj_reg_width[i] and proj_reg_left[i] shall be less than proj_picture_width.

The sum of proj_reg_height[i] and proj_reg_top[i] shall be less than proj_picture_height.

When the projected picture is stereoscopic, proj_reg_width[i], proj_reg_height[i], proj_reg_top[i] and proj_reg_left[i] shall be such that the projected region identified by these fields is within a single constituent picture of the projected picture.

transform_type[i] specifies the rotation and mirroring that have been applied to the i-th projected region to map it to the packed picture before encoding. When transform_type[i] specifies both rotation and mirroring, rotation has been applied after mirroring in the region-wise packing from the projected picture to the packed picture before encoding. The following values are specified:

0: no transform
1: mirroring horizontally
2: rotation by 180 degrees (counter-clockwise)
3: rotation by 180 degrees (counter-clockwise) after mirroring horizontally
4: rotation by 90 degrees (counter-clockwise) after mirroring horizontally
5: rotation by 90 degrees (counter-clockwise)
6: rotation by 270 degrees (counter-clockwise) after mirroring horizontally
7: rotation by 270 degrees (counter-clockwise)

NOTE 3: Clause 5.4 specifies the semantics of transform_type[i] for converting a sample location of a packed region in a packed picture to a sample location of a projected region in a projected picture.

packed_reg_width[i], packed_reg_height[i], packed_reg_top[i] and packed_reg_left[i] are indicated in units of luma samples in a packed picture with width and height equal to PackedPicWidth and PackedPicHeight, respectively.

packed_reg_width[i], packed_reg_height[i], packed_reg_top[i], and packed_reg_left[i] specify the width, height, the top luma sample row, and the left-most luma sample column, respectively, of the packed region in the packed picture.

The values of packed_reg_width[i], packed_reg_height[i], packed_reg_top[i], and packed_reg_left[i] are constrained as follows:

packed_reg_width[i] and packed_reg_height[i] shall both be greater than 0.

packed_reg_top[i] and packed_reg_left[i] shall in the range from 0, inclusive, indicating the top-left corner luma sample of the packed picture, to PackedPicHeight−1, inclusive, and PackedPicWidth−1, inclusive, respectively.

The sum of packed_reg_width[i] and packed_reg_left[i] shall be less than PackedPicWidth.

The sum of packed_reg_height[i] and packed_reg_top[i] shall be less than PackedPicHeight.

The rectangle specified by packed_reg_width[i], packed_reg_height[i], packed_reg_top[i], and packed_reg_left[i] shall be non-overlapping with the rectangle specified by packed_reg_width[j], packed_reg_height[j], packed_reg_top[j], and packed_reg_left[j] for any value of j in the range of 0 to i−1, inclusive.

Figure 4:
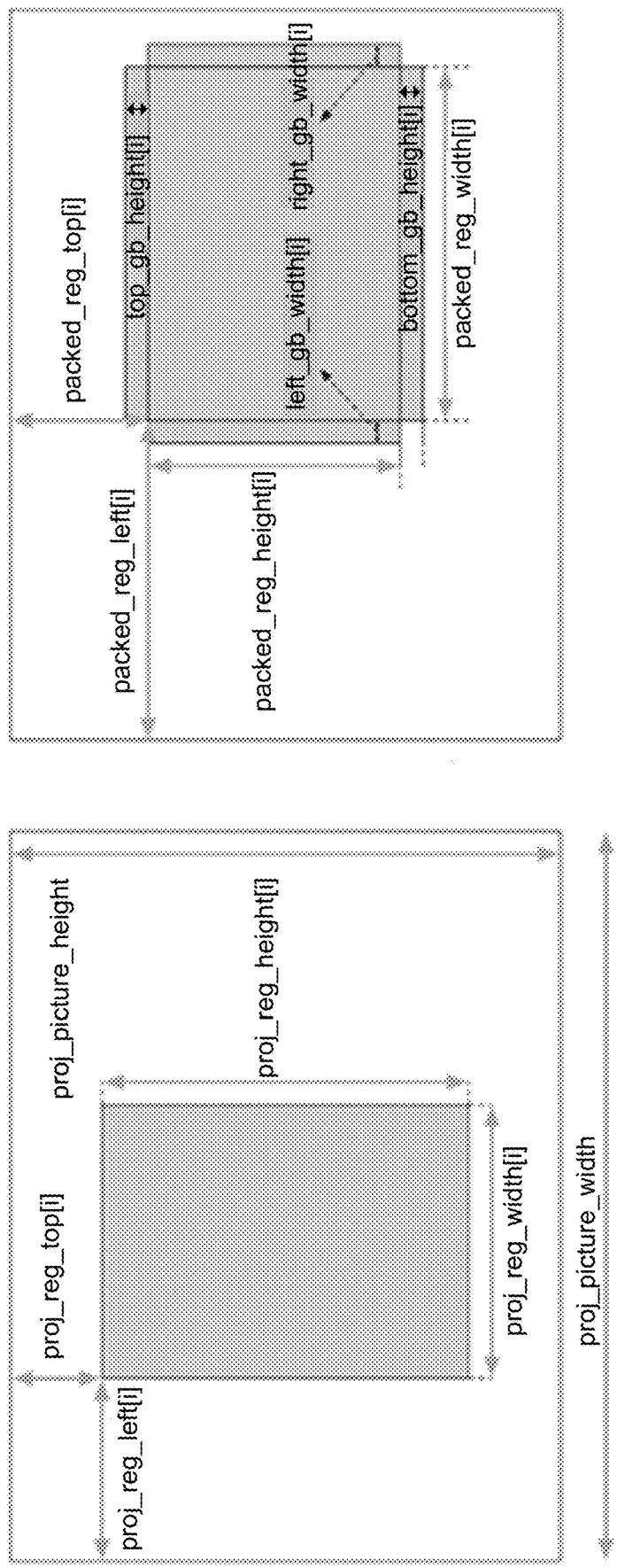
FIG. 4 is a conceptual diagram illustrating an example projected region and a corresponding packed region with guard bands.

FIG. 4 is a conceptual diagram illustrating an example projected region and a corresponding packed region with guard bands. JCT-VC document JCTVC-AA0026 (available from phenix.int-evry.fr/jct/doc_end_user/documents/28_Torino/wg11/JCTVC-AB0026-v3.zip) includes an omnidirectional region-wise packing SEI message for signalling of RWP information in video bitstreams, e.g., according to HEVC. The syntax and semantics of the omnidirectional region-wise packing SEI message are as follows.

| omni_region_wise_packing( payloadSize ) { | Descriptor |
|---|---|
| omni_region_wise_packing_cancel_flag | u(1) |
| if( !omni_region_wise_packing_cancel_flag ) { | |
| omni_region_wise_packing_persistence_flag | u(1) |
| rwp_reserved_zero_6bits | u(6) |
| num_packed_regions | u(8) |
| proj_picture_width | u(16) |
| proj_picture_height | u(16) |
| for( i = 0; i < num_packed_regions; i++ ) { | |
| rwp_reserved_zero_4bits[ i ] | u(4) |
| packing_type[ i ] | u(4) |

-continued

| omni_region_wise_packing( payloadSize ) { | Descriptor |
|---|---|
|   if( packing_type[ i ] = = 0 ) { | |
|     proj_reg_width[ i ] | u(16) |
|     proj_reg_height[ i ] | u(16) |
|     proj_reg_top[ i ] | u(16) |
|     proj_reg_left[ i ] | u(16) |
|     transform_type[ i ] | u(3) |
|     rwp_reserved_zero_5bits[ i ] | u(5) |
|     packed_reg_width[ i ] | u(16) |
|     packed_reg_height[ i ] | u(16) |
|     packed_reg_top[ i ] | u(16) |
|     packed_reg_left[ i ] | u(16) |
|   } | |
|   } | |
| } | |
| } | |

The omnidirectional region-wise packing SEI message provides information to enable remapping of the color samples of the output decoded pictures onto projected pictures. The definitions of "projected picture" and "packed picture" are as defined in the latest OMAF draft text. JCTVC-AA0026 defines semantics for the syntax elements above as follows:

omni_region_wise_packing_cancel_flag equal to 1 indicates that the SEI message cancels the persistence of any previous omnidirectional region-wise packing SEI message in output order. omni_region_wise_packing_cancel_flag equal to 0 indicates that omnidirectional region-wise packing information follows.

omni_region_wise_packing_persistence_flag specifies the persistence of the omnidirectional region-wise packing SEI message for the current layer.

omni_region_wise_packing_persistence_flag equal to 0 specifies that the omnidirectional region-wise packing SEI message applies to the current decoded picture only.

Let picA be the current picture. omni_region_wise_packing_persistence_flag equal to 1 specifies that the omnidirectional region-wise packing SEI message persists for the current layer in output order until one or more of the following conditions are true:

A new CLVS of the current layer begins.

The bitstream ends.

A picture picB in the current layer in an access unit containing an omnidirectional region-wise packing SEI message that is applicable to the current layer is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for picture order count for picB.

When an omnidirectional projection indication SEI message with omni_projection_information_cancel_flag equal to 0 is not present in the CLVS that applies to the current picture and precedes the omnidirectional region-wise packing SEI message in decoding order, an omnidirectional region-wise packing SEI message with omni_region_wise_packing_persistence_flag equal to 0 shall not be present in the CLVS that applies to the current picture. Decoders shall ignore omnidirectional region-wise packing SEI messages with omni_region_wise_packing_persistence_flag equal to 0 that do not follow, in decoding order, an omnidirectional projection indication SEI message with omni_projection_information_cancel_flag equal to 0 in the CLVS that applies to the current picture.

rwp_reserved_zero_6bits shall be equal to 0 in bitstreams conforming to this version of this Specification. Other values for rwp_reserved_zero_6bits[i] are reserved for future use by ITU-T ISO/IEC. Decoders shall ignore the value of rwp_reserved_zero_6bits[i].

num_packed_regions specifies the number of packed regions. The value of num_packed_regions shall be greater than 0.

proj_picture_width and proj_picture_height specify the width and height, respectively, of the projected picture. The value of proj_picture_width and proj_picture_height shall be both greater than 0.

rwp_reserved_zero_4bits shall be equal to 0 in bitstreams conforming to this version of this Specification. Other values for rwp_reserved_zero_4bits[i] are reserved for future use by ITU-T ISO/IEC. Decoders shall ignore the value of rwp_reserved_zero_4bits[i].

packing_type[i] specifies the type of region-wise packing. packing_type[i] equal to 0 indicates rectangular region-wise packing. Other values are reserved. The value of packing_type[i] shall be equal to 0 in this version of this Specification. Decoders shall allow values of packing_type[i] greater than 0 and shall ignore all omnidirectional region-wise packing SEI messages with packing_type[i] greater than 0 for any value of i.

proj_reg_width[i], proj_reg_height[i], proj_reg_top[i], and proj_reg_left[i] are indicated in units of luma samples in a projected picture with width and height equal to proj_picture_width and proj_picture_height, respectively.

proj_reg_width[i] specifies the width of the i-th projected region. proj_reg_width[i] shall be greater than 0.

proj_reg_height[i] specifies the height of the i-th projected region. proj_reg_height[i] shall be greater than 0.

proj_reg_top[i] and proj_reg_left[i] specify the top luma sample row and the left-most luma sample column, respectively, in the projected picture. The values of proj_reg_top[i] and proj_reg_left[i], shall be in the range from 0, inclusive, indicating the top-left corner of the projected picture, to proj_picture_height−1, inclusive, and proj_picture_width−1, inclusive, respectively.

The sum proj_reg_width[i] and proj_reg_left[i] shall be less than proj_picture_width. The sum of proj_reg_height[i] and proj_reg_top[i] shall be less than proj_picture_height.

When the projected picture is stereoscopic, proj_reg_width[i], proj_reg_height[i], proj_reg_top[i] and proj_reg_left[i] shall be such that the projected region identified by these fields is within a single constituent picture of the projected picture.

transform_type[i] specifies the rotation and mirroring that have been applied to the i-th projected region to map it to the packed picture before encoding. When transform_type[i] specifies both rotation and mirroring, rotation has been applied after mirroring in the region-wise packing from the projected picture to the packed picture before encoding. The values of transform_type[i] are specified in the following table:

| Table of transform_type[i] values | |
|---|---|
| Value | Description |
| 0 | no transform |
| 1 | mirroring horizontally |
| 2 | rotation by 180 degrees (counter-clockwise) |
| 3 | rotation by 180 degrees (counter-clockwise) after mirroring horizontally |
| 4 | rotation by 90 degrees (counter-clockwise) after mirroring horizontally |

-continued

Table of transform_type[i] values

| Value | Description |
|---|---|
| 5 | rotation by 90 degrees (counter-clockwise) |
| 6 | rotation by 270 degrees (counter-clockwise) after mirroring horizontally |
| 7 | rotation by 270 degrees (counter-clockwise) | rwp_reserved_zero_5bits shall be equal to 0 in bitstreams conforming to this version of this Specification. Other values for rwp_reserved_zero_5bits[i] are reserved for future use by ITU-T|ISO/IEC. Decoders shall ignore the value of rwp_reserved_zero_5bits[i].

packed_reg_width[i], packed_reg_height[i], packed_reg_top[i], and packed_reg_left[i] specify the width, height, the top luma sample row, and the left-most luma sample column, respectively, of the packed region in the packed picture.

Let packedPicWidth and packedPicHeight be the width and height of the packed picture, which has the same size as the conformance cropping window. The values of packed_reg_width[i], packed_reg_height[i], packed_reg_top[i], and packed_reg_left[i] are constrained as follows:

packed_reg_width[i] and packed_reg_height[i] shall both be greater than 0.

The values of packed_reg_top[i] and packed_reg_left[i] shall in the range from 0, inclusive, indicating the top-left corner luma sample of the packed picture, to packedPicHeight−1, inclusive, and packedPicWidth−1, inclusive, respectively.

The sum of packed_reg_width[i] and packed_reg_left[i] shall be less than packedPicWidth.

The sum of packed_reg_height[i] and packed_reg_top[i] shall be less than packedPicHeight.

The rectangle specified by packed_reg_width[i], packed_reg_height[i], packed_reg_top[i], and packed_reg_left[i] shall be non-overlapping with the rectangle specified by packed_reg_width[j], packed_reg_height[j], packed_reg_top[j], and packed_reg_left[j] for any value of j in the range of 0 to i−1, inclusive.

OMAF also describes content coverage signalling. Clause 7.2.7 of the OMAF draft text specifies the global coverage information box. This box provides information on the area on the sphere covered by the entire content. If this track belongs to a sub-picture composition track group, the entire content refers to the content represented by all tracks belonging to the same sub-picture composition track group, and a composition picture composed from these tracks is referred to as a packed picture of the entire content. Otherwise, the entire content refers to the content represented by this track itself, and the picture of a sample in this track is referred to as a packed picture of the entire content.

Clause 7.2.7 of the OMAF draft text specifies the track coverage information box. This box provides information on the area on the sphere covered by the content represented by this track.

Clause 8.2.3 of the OMAF draft text specifies the content coverage (CC) descriptor as follows:

A content coverage (CC) SupplementalProperty element with a @schemeIdUri attribute equal to "urn:mpeg:omaf:cc:2017" may be present at adaptation set level (i.e., directly in an AdaptationSet element) and shall not be present in other levels (i.e., shall not be present at MPD level or directly in any Representation element). The @value of the CC descriptor with @schemeIdUri equal to "urn:mpeg:omaf:cc:2017" is a comma separated list of values as specified in the following table. The CC descriptor indicates that each Representation covers the sphere region as specified in clause 7.4 by shape type and syntax elements center_yaw, center_pitch, center_roll, hor_range, and ver_range in SphereRegionStruct as included in the CC descriptor.

| @value parameter for CC descriptor | Use | Description |
|---|---|---|
| shape_type | M | Specifies the shape type of the sphere region, as specified in DASH Section 7.4.2.3, that is covered by each Representation. |
| center_yaw | M | Specifies the yaw of the center point the sphere region in degrees relative to the global coordinate axes. |
| center_pitch | M | Specifies the pitch of the center point the sphere region in degrees relative to the global coordinate axes. |
| center_roll | M | Specifies the roll of the sphere region in degrees relative to the global coordinate axes. |
| hor_range | M | Specifies the horizontal range of the sphere region through the center point of the sphere region. |
| ver_range | M | Specifies the vertical range of the sphere region through the center point of the sphere region. |

The absence of the CC descriptor indicates that each Representation covers the entire sphere when a PF descriptor is present, either in the Representation or the containing Adaptation Set.

Figure 5:
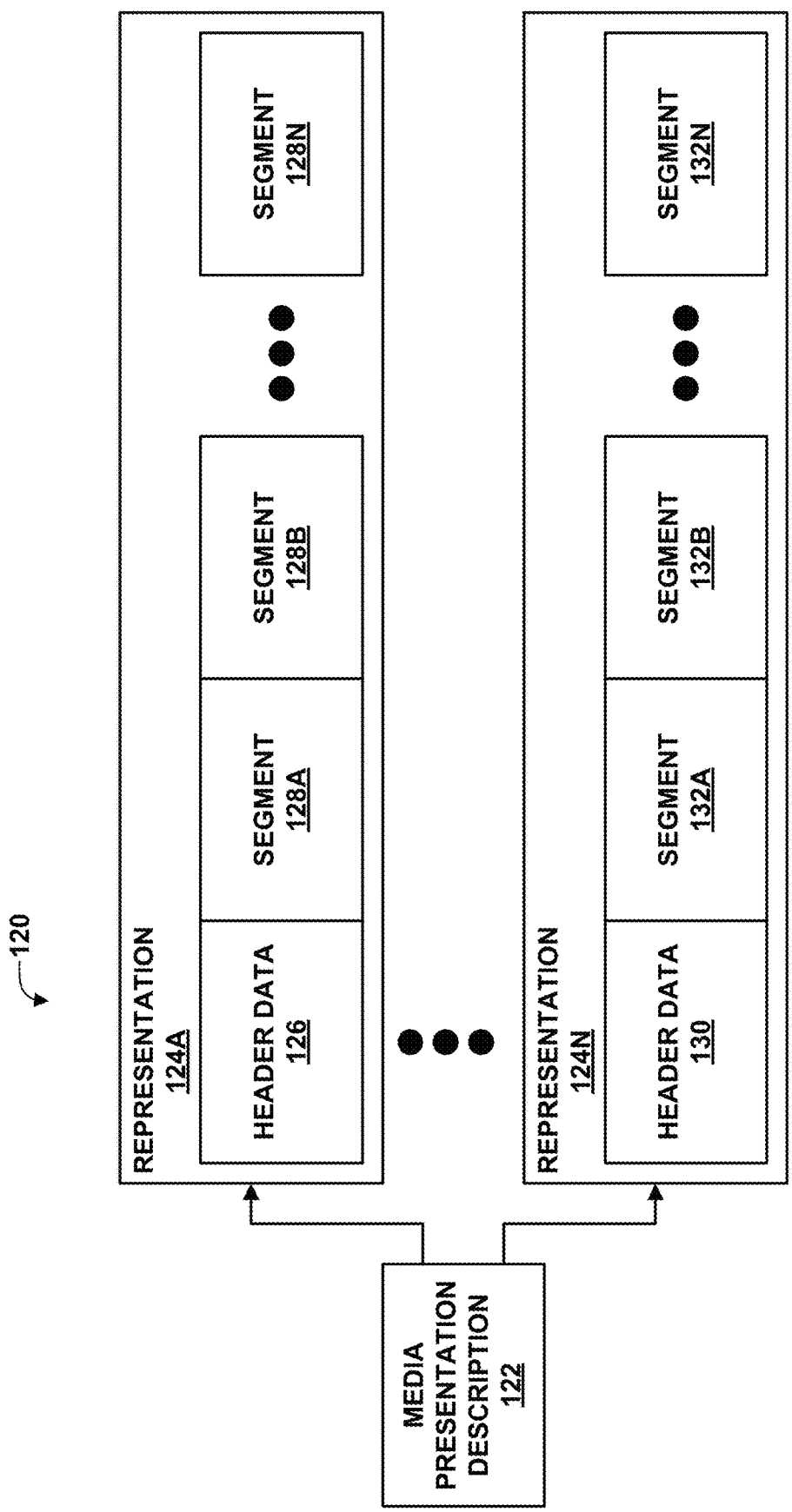
FIG. 5 is a conceptual diagram illustrating elements of example multimedia content.

FIG. 5 is a conceptual diagram illustrating elements of example multimedia content 120. Multimedia content 120 may correspond to multimedia content 64 (FIG. 1), or another multimedia content stored in storage medium 62. In the example of FIG. 5, multimedia content 120 includes media presentation description (MPD) 122 and a plurality of representations 124A-124N (representations 124). Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124. MPD 122 may correspond to manifest file 66 of FIG. 1. Likewise, representations 124 may correspond to representations 68 of FIG. 2. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 5. MPD 122 may include characteristics as described by the 3GPP Specification, with the addition of any or all of the signaled information described in this disclosure.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

In accordance with the techniques of this disclosure, MPD 122 may include data signaling a content coverage descriptor at an Adaptation Set level or at a Preselection level. MPD 122 may additionally or alternatively include region-wise packing boxes defining overlapping regions per the techniques of this disclosure. MPD 122 may additionally or alternatively include a FramePacking element having both a video frame packing type (VideoFramePackingType) value and a quincunx sampling value (QuincunxSamplingFlag), separated by commas, where the quincunx sampling value may indicate whether one or more corresponding frames are quincunx (checkerboard) packed.

Figure 6:
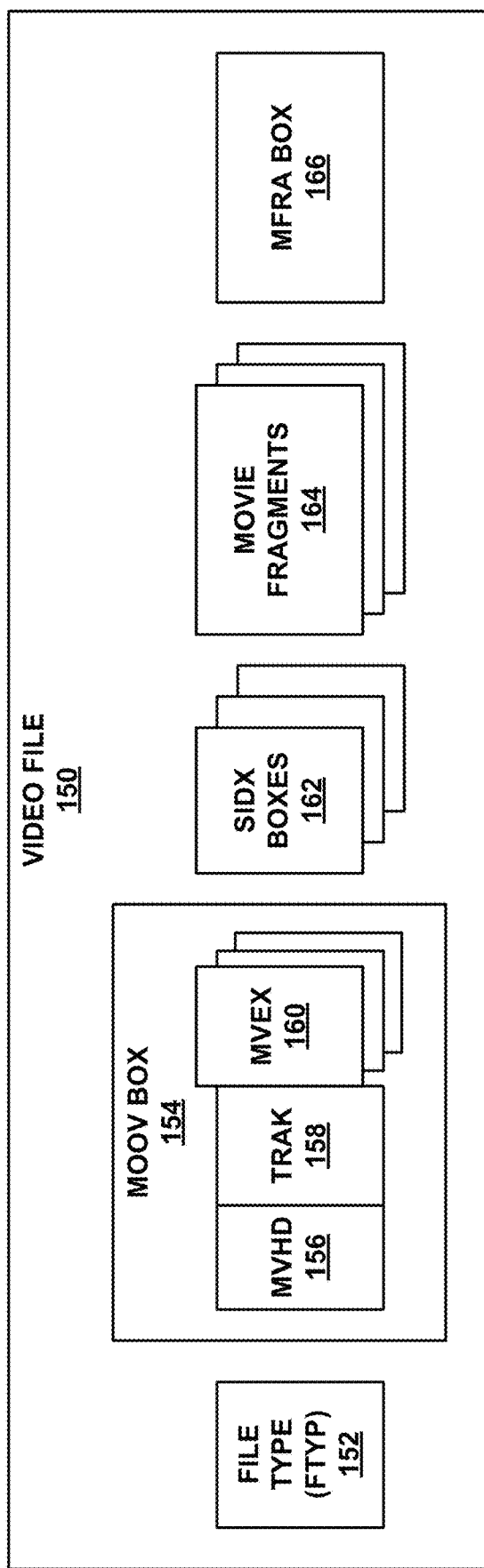
FIG. 6 is a block diagram illustrating elements of an example video file.

FIG. 6 is a block diagram illustrating elements of an example video file 150, which may correspond to a segment of a representation, such as one of segments 128, 132 of FIG. 5. Each of segments 128, 132 may include data that conforms substantially to the arrangement of data illustrated in the example of FIG. 6. Video file 150 may be said to encapsulate a segment. As described above, video files in accordance with the ISO base media file format and extensions thereof store data in a series of objects, referred to as "boxes." In the example of FIG. 6, video file 150 includes file type (FTYP) box 152, movie (MOOV) box 154, segment index (sidx) boxes 162, movie fragment (MOOF) boxes 164, and movie fragment random access (MFRA) box 166. Although FIG. 6 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

Figure 7:
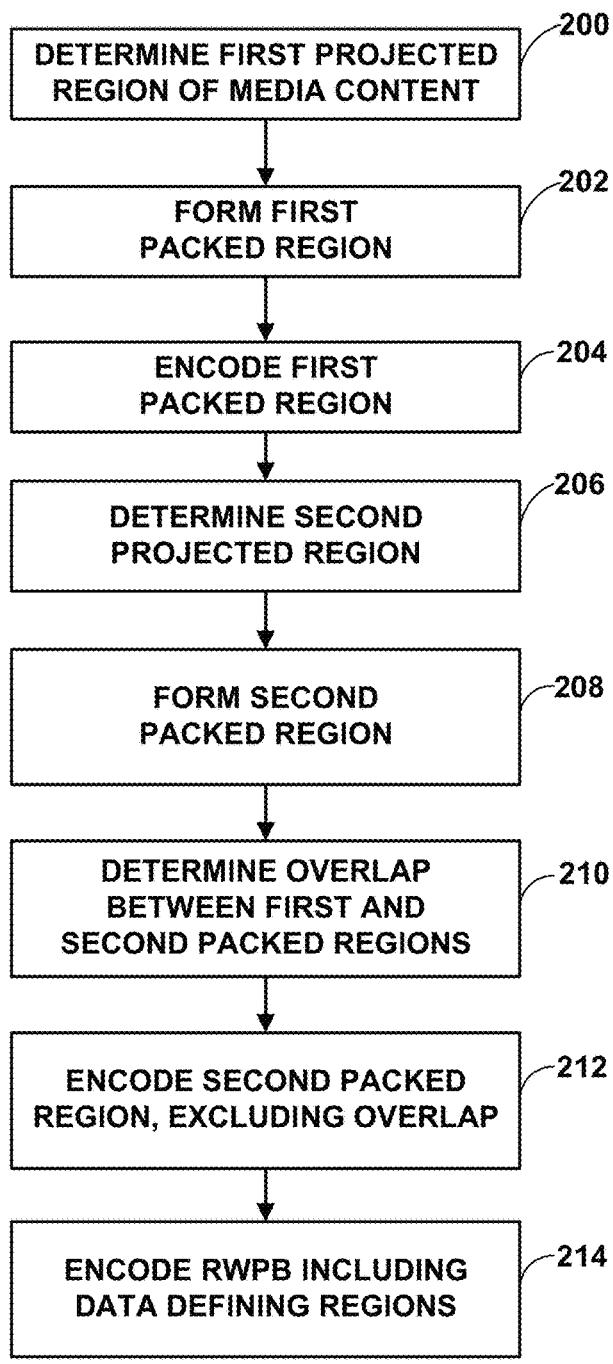
FIG. 7 is a flowchart illustrating an example method of generating video data according to the techniques of this disclosure.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150. FIG. 7, discussed in greater detail below, provides additional information with respect to the MPD update box.

MOOV box 154, in the example of FIG. 6, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 5) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture include one or more VCL NAL units which contains the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 6). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

In accordance with the techniques of this disclosure, video file 150 may further include a region-wise packing box (RWPB) including information as discussed above, e.g., within MOOV box 154. The RWPB may include an RWPB struct that defines locations of packed regions, and corresponding projected regions in a spherical video projection. In accordance with the techniques of this disclosure, the data of the RWPB may indicate that packed regions overlap. In this manner, a client device, such as client device 40, may use the RWPB information to reuse data of one packed region to fill an overlapped portion of another packed region.

FIG. 7 is a flowchart illustrating an example method of generating video data according to the techniques of this disclosure. In general, the method of FIG. 7 is discussed with respect to content preparation device 20 (FIG. 1). However, it should be understood that other devices, such as server device 60, may be configured to perform this or a similar method.

Initially, content preparation device receives media content, including video data from video source 24. The video data may represent spherical video data, e.g., for use in VR, augmented reality, or the like. Thus, content preparation device 20 may determine a first projected region of the media content (200). The first projected region may correspond to a portion of spherical data, such as that shown in FIG. 3.

Content preparation device 20 may then form a first packed region from the first projected region (204). For example, content preparation device 20 may perform decimation along a horizontal and/or vertical dimension of the first projected region to form the first packed region. Content preparation device 20 may then provide the first packed region to video encoder 28, to cause video encoder 28 to encode the first packed region (206).

Content preparation device 20 may then determine a second projected region from the received media content (206). Content preparation device 20 may form a second packed region from the second projected region (208). For example, content preparation device 20 may perform decimation along a horizontal and/or vertical dimension of the second projected region to form the second packed region. In this case, content preparation device 20 further determines that an overlap exists between the first packed region and the second packed region (210). Thus, content preparation device 20 provides the non-overlapping portion of the second packed region to video encoder 28, to cause video encoder 28 to encode the second packed region, excluding the overlap with the first packed region (212).

In addition, content preparation device 20 may encode a region-wise packing box (RWPB) as discussed above, defining positions of the first and second packed regions (214). In this manner, a client device, such as client device 40, may use the RWPB information to extract data for the overlapped portion of the second packed region from the corresponding overlapped portion of the first packed region. Thus, content preparation device 20 may avoid re-encoding the overlapped portion, thereby saving storage, processing, and network bandwidth associated with processing, encoding, and transporting the overlapped portion.

Figure 8:
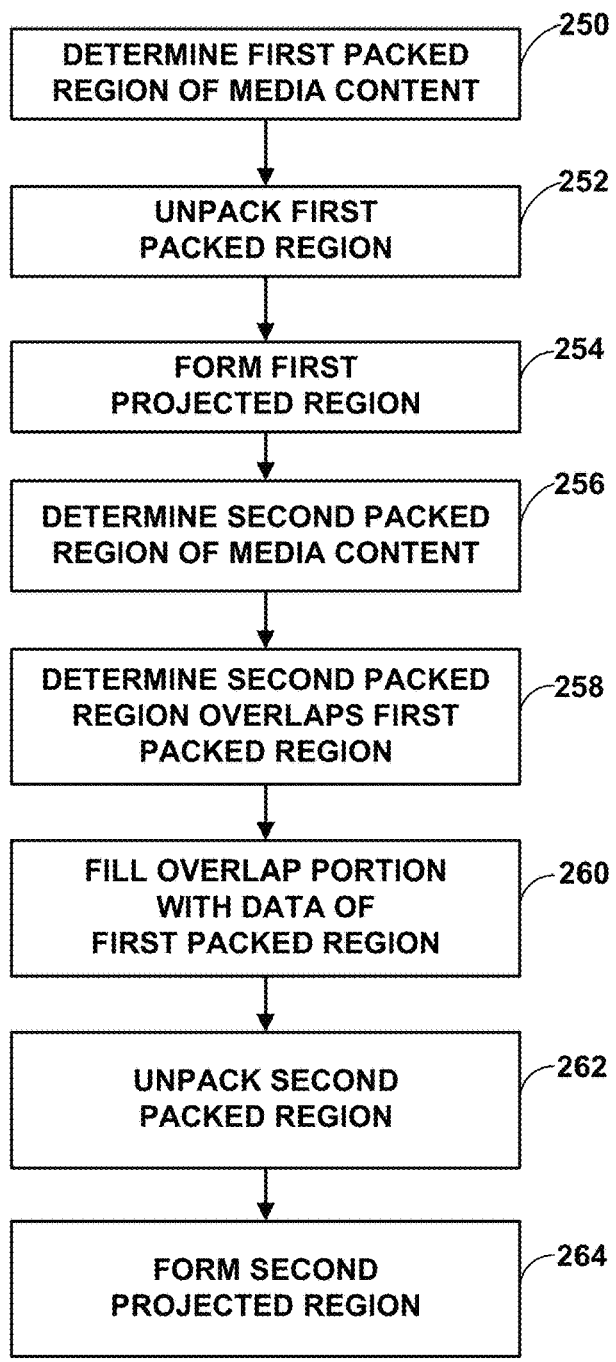
FIG. 8 is a flowchart illustrating an example method of receiving and processing video data in accordance with the techniques of this disclosure.

FIG. 8 is a flowchart illustrating an example method of receiving and processing video data in accordance with the techniques of this disclosure. In general, the method of FIG. 8 is discussed with respect to client device 40 (FIG. 1). However, it should be understood that other devices may be configured to perform this or a similar method.

Initially, client device 40 may decode video data of media content. Client device 40 may then determine a first packed region of the decoded video data of the media content (250). For example, client device 40 may receive a region-wise packing box (RWPB) including information as discussed above representing positions of the first packed region and a second packed region of the decoded video data of the media content.

Client device 40 may then unpack the first packed region (252) and form a first projected region from the first unpacked region (254). For example, client device 40 may interpolate data of the first packed region to form the first projected region, then reposition the first projected region according to the RWPB information.

Client device 40 may then determine a second packed region of the decoded video data of the media content (256). Using position information of the RWPB information, for example, client device 40 may determine that the second packed region overlaps the first packed region (258). Thus, client device 40 may retrieve video data of the corresponding overlapped portion of the first packed region to fill the overlapped portion of the second packed region with the data of the first packed region (260).

Client device 40 may then unpack the second packed region (262) and form a second projected region from the second unpacked region (264). For example, client device 40 may interpolate data of the second packed region to form the second projected region, then reposition the second projected region according to the RWPB information.

In this manner, the method of FIG. 8 represents an example of a method including processing a first packed region of media content, wherein processing the first packed region comprises: unpacking the first packed region to produce a first unpacked region, and forming a first projected region from the first unpacked region; and processing a second packed region of the media content, the second packed region overlapping the first packed region at least in part, wherein processing the second packed region comprises: unpacking the second packed region to produce a second unpacked region, and forming a second projected region from the second unpacked region, the second projected region being different than the first projected region.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing media content, the method comprising:
   processing a first packed region of media content, the first packed region comprising first decoded video data, wherein processing the first packed region comprises:
   unpacking the first packed region to produce a first unpacked region; and
   forming a first projected region from the first unpacked region, wherein forming the first projected region comprises interpolating the first decoded video data and repositioning the interpolated first decoded video data; and
   processing a second packed region of the media content, the second packed region comprising second decoded video data, and the second packed region overlapping the first packed region at least in part, wherein processing the second packed region comprises:
   unpacking the second packed region to produce a second unpacked region; and
   forming a second projected region from the second unpacked region, the second projected region being different than the first projected region, wherein forming the second projected region comprises repositioning the second decoded video data.

2. The method of claim 1,
   wherein processing the first packed region comprises:
      determining a first width of the first packed region from a first width value;
      determining a first height of the first packed region from a first height value;
      determining a first top offset of the first packed region from a first top value; and
      determining a first left offset of the first packed region from a first left value; and
   wherein processing the first packed region comprises:
      determining a second width of the second packed region from a second width value;
      determining a second height of the second packed region from a second height value;
      determining a second top offset of the second packed region from a second top value; and
      determining a second left offset of the second packed region from a second left value.

3. The method of claim 2, wherein the first width value comprises a packed_reg_width[i] value, the first height value comprises a packed_reg_height[i] value, the first top value comprises a packed_reg_top[i] value, the first left value comprises a packed_reg_left[i], the second width value comprises a packed_reg_width[j] value, the second height value comprises a packed_reg_height[j] value, the second top value comprises a packed_reg_top[j] value, and the second left value comprises a packed_reg_left[j] value.

4. The method of claim 1, wherein processing the second packed region further comprises:
   determining a portion of the second packed region that overlaps the first packed region; and
   filling the portion of the second packed region with a corresponding portion of the first packed region that overlaps the portion of the second packed region,
   wherein unpacking the second packed region comprises unpacking the second packed region, including the filled portion, to produce the second unpacked region.

5. The method of claim 1, wherein the media content is monoscopic.

6. The method of claim 1, wherein the media content is stereoscopic.

7. The method of claim 6, wherein the first packed region corresponds to a first picture of the media content, and wherein the second packed region corresponds to a second picture of the media content.

8. The method of claim 6, wherein the first packed region corresponds to a picture of the media content, and wherein the second packed region corresponds to the picture of the media content.

9. The method of claim 1, further comprising processing data of a manifest file defining the first packed region and the second packed region.

10. The method of claim 9, wherein the manifest file comprises a Dynamic Adaptive Streaming over HTTP (DASH) Media Presentation Description (MPD).

11. The method of claim 1, further comprising processing a content coverage description at a Preselection level of the media content.

12. The method of claim 11, wherein processing the content coverage description comprises processing a manifest file comprising the content coverage description.

13. The method of claim 12, wherein the manifest file comprises a Dynamic Adaptive Streaming over HTTP (DASH) Media Presentation Description (MPD).

14. The method of claim 1, further comprising:
   processing a video frame packing type value of a Frame-Packing element of Dynamic Adaptive Streaming over HTTP (DASH) data for the media content; and
   processing a quincunx sampling flag value of the Frame-Packing element of the DASH data.

15. The method of claim 14, wherein the DASH data comprises a DASH Media Presentation Description (MPD).

16. A device for processing media content, the device comprising:
   a memory configured to store media content; and
   one or more processors implemented in circuitry and configured to:
      process a first packed region of the media content, the first packed region comprising first decoded video data, wherein to process the first packed region, the one or more processors are configured to:
         unpack the first packed region to produce a first unpacked region; and
         form a first projected region from the first unpacked region, wherein to form the first projected region, the one or more processors are configured to interpolate the first decoded video data and reposition the interpolated first decoded video data; and
      process a second packed region of the media content, the second packed region comprising second decoded video data, and the second packed region overlapping the first packed region at least in part, wherein to process the second packed region, the one or more processors are configured to:
         unpack the second packed region to produce a second unpacked region; and
         form a second projected region from the second unpacked region, wherein to form the second projected region, the one or more processors are configured to reposition the second decoded video data.

17. The device of claim 16,
   wherein to process the first packed region, the one or more processors are configured to:
      determine a first width of the first packed region from a first width value;

determine a first height of the first packed region from a first height value;

determine a first top offset of the first packed region from a first top value; and determine a first left offset of the first packed region from a first left value; and wherein to process the second packed region, the one or more processors are configured to:

determine a second width of the second packed region from a second width value;

determine a second height of the second packed region from a second height value;

determine a second top offset of the second packed region from a second top value; and determine a second left offset of the second packed region from a second left value.

18. The device of claim 17, wherein the first width value comprises a packed_reg_width[i] value, the first height value comprises a packed_reg_height[i] value, the first top value comprises a packed_reg_top[i] value, the first left value comprises a packed_reg_left[i], the second width value comprises a packed_reg_width[j] value, the second height value comprises a packed_reg_height[j] value, the second top value comprises a packed_reg_top[j] value, and the second left value comprises a packed_reg_left[j] value.

19. The device of claim 16, wherein to process the second packed region, the one or more processors are further configured to:

determine a portion of the second packed region that overlaps the first packed region; and fill the portion of the second packed region with a corresponding portion of the first packed region that overlaps the portion of the second packed region, wherein to unpack the second packed region, the one or more processors are configured to unpack the second packed region, including the filled portion, to produce the second unpacked region.

20. The device of claim 16, wherein the media content is monoscopic.

21. The device of claim 16, wherein the media content is stereoscopic.

22. The device of claim 21, wherein the first packed region corresponds to a first picture of the media content, and wherein the second packed region corresponds to a second picture of the media content.

23. The device of claim 21, wherein the first packed region corresponds to a picture of the media content, and wherein the second packed region corresponds to the picture of the media content.

24. The device of claim 16, wherein the one or more processors are further configured to process data of a manifest file defining the first packed region and the second packed region.

25. The device of claim 24, wherein the manifest file comprises a Dynamic Adaptive Streaming over HTTP (DASH) Media Presentation Description (MPD).

26. The device of claim 16, wherein the one or more processors are further configured to process a content coverage description at a Preselection level of the media content.

27. The device of claim 26, wherein processing the content coverage description comprises processing a manifest file comprising the content coverage description.

28. The device of claim 27, wherein the manifest file comprises a Dynamic Adaptive Streaming over HTTP (DASH) Media Presentation Description (MPD).

29. The device of claim 16, wherein the one or more processors are further configured to:

process a video frame packing type value of a Frame-Packing element of Dynamic Adaptive Streaming over HTTP (DASH) data for the media content; and process a quincunx sampling flag value of the Frame-Packing element of the DASH data.

30. The device of claim 29, wherein the DASH data comprises a DASH Media Presentation Description (MPD).

31. The device of claim 16, wherein the device comprises at least one of:

an integrated circuit;

a microprocessor; and a wireless communication device.

32. The device of claim 16, wherein the device comprises a client device.

33. A device for processing media content, the device comprising:

means for processing a first packed region of media content, the first packed region comprising first decoded video data, wherein the means for processing the first packed region comprises:

means for unpacking the first packed region to produce a first unpacked region; and means for forming a first projected region from the first unpacked region wherein the means for forming the first projected region comprises means for interpolating the first decoded video data and means for repositioning the interpolated first decoded video data; and means for processing a second packed region of the media content, the second packed region comprising second decoded video data, and the second packed region overlapping the first packed region at least in part, wherein the means for processing the second packed region comprises:

means for unpacking the second packed region to produce a second unpacked region; and means for forming a second projected region from the second unpacked region, the second projected region being different than the first projected region, wherein the means for forming the second projected region comprises means for repositioning the second decoded video data.

34. The device of claim 33, wherein the means for processing the first packed region comprises:

means for determining a first width of the first packed region from a first width value;

means for determining a first height of the first packed region from a first height value;

means for determining a first top offset of the first packed region from a first top value; and means for determining a first left offset of the first packed region from a first left value; and wherein the means for processing the first packed region comprises:

means for determining a second width of the second packed region from a second width value;

means for determining a second height of the second packed region from a second height value;

means for determining a second top offset of the second packed region from a second top value; and means for determining a second left offset of the second packed region from a second left value.

35. The device of claim 34, wherein the first width value comprises a packed_reg_width[i] value, the first height value comprises a packed_reg_height[i] value, the first top value comprises a packed_reg_top[i] value, the first left value comprises a packed_reg_left[i], the second width value comprises a packed_reg_width[j] value, the second height value comprises a packed_reg_height[j] value, the second top value comprises a packed_reg_top[j] value, and the second left value comprises a packed_reg_left[j] value.

36. The device of claim 33, wherein the means for processing the second packed region further comprises:
    means for determining a portion of the second packed region that overlaps the first packed region; and
    means for filling the portion of the second packed region with a corresponding portion of the first packed region that overlaps the portion of the second packed region,
    wherein the means for unpacking the second packed region comprises means for unpacking the second packed region, including the filled portion, to produce the second unpacked region.

37. The device of claim 33, wherein the media content is stereoscopic.

38. The device of claim 37, wherein the first packed region corresponds to a first picture of the media content, and wherein the second packed region corresponds to a second picture of the media content.

39. The device of claim 37, wherein the first packed region corresponds to a picture of the media content, and wherein the second packed region corresponds to the picture of the media content.

* * * * *